(No Model.)

H. H. YOUNG.
CLIP FOR VEHICLES.

No. 489,777. Patented Jan. 10, 1893.

Witnesses

Inventor
Howard H. Young,
By Attorneys

UNITED STATES PATENT OFFICE.

HOWARD H. YOUNG, OF ALEXANDRIA, VIRGINIA.

CLIP FOR VEHICLES.

SPECIFICATION forming part of Letters Patent No. 489,777, dated January 10, 1893.

Application filed July 19, 1892. Serial No. 440,504. (No model.)

*To all whom it may concern:*

Be it known that I, HOWARD H. YOUNG, a citizen of the United States, residing at Alexandria, in the county of Alexandria, State of Virginia, have invented certain new and useful Improvements in Clips; and I do hereby declare the following to be a full, clear, and exact description of the invention, such as will enable others skilled in the art to which it appertains to make and use the same.

My invention relates to clips for use on vehicles and in such positions where it is possible and desirable to use this class of fastenings.

The object of the invention is to simplify the construction of clip fastenings and reduce the parts to a minimum number, thereby reducing the cost of manufacture and increasing the efficiency of the same.

Figure 1:
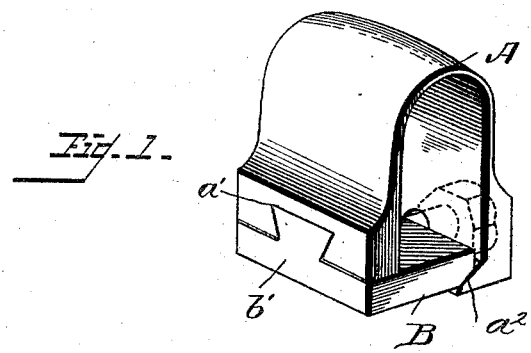
Figure 2:
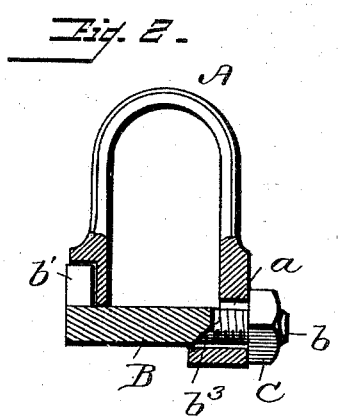
Figure 3:
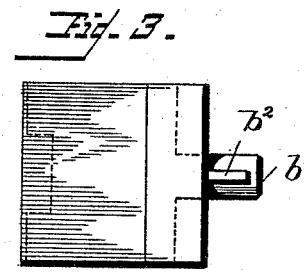
Figure 4:
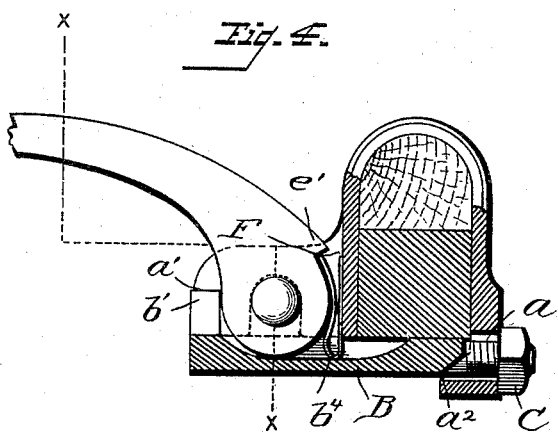
Figure 5:
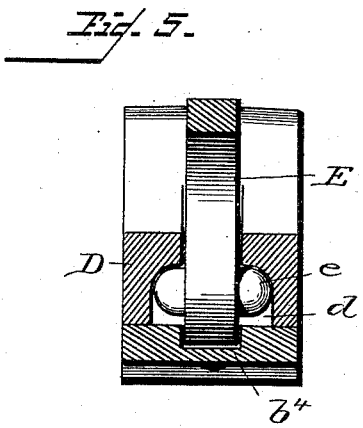

The improvement consists of the novel features and the peculiar construction and combination of the parts which will be hereinafter more fully described and claimed and which are shown in the annexed drawings in which;

Figure 1 is a perspective view of a clip embodying my invention. Fig. 2 is a side elevation of the clip, parts being broken away to show the relative disposition of the bow and the yoke plate. Fig. 3 is a bottom plan view of a yoke plate showing the extension provided with a longitudinal slot to receive a key. Fig. 4 is a modification showing the application of the invention to a thill coupling. Fig. 5 is a section on the line X—X of Fig. 4 looking to the right.

In the drawings similar letters refer to corresponding parts in the several figures.

The clip is composed essentially of the bow A and the yoke plate B. One of the members of the yoke is made longer than the other and is provided with an opening $a$ through which extends the projection $b$ provided at one end of the yoke plate B, and the shorter member is provided with a recess or depression $a'$ to receive a corresponding projection $b'$ on the opposite end of the yoke plate B to form an interlocking joint or fastening means between the shorter member of the bow and the outer end of the yoke plate. The recess or depression $a'$ is dove-tail shaped and the projection $b'$ is of a corresponding shape to fit snugly in said recess or depression. Any form may be given to the recess $a'$ and the projection $b'$ that will form an interlocking joint and is contemplated in the term dove-tail joint.

The yoke plate B is constructed to close the open end of the bow and one end is provided with a projection $b'$ which is of a corresponding shape to enter the recess or depression $a'$ and its opposite end has a projection $b$ to be thrust through the opening $a$ and may be threaded to receive a nut C or have a longitudinal slot $b^2$ to receive a tapering or other form of key, not shown, but which may be readily understood on reference to Fig. 3.

In order that the clip may be tightened when applied to the part to be fastened, a beveled extension $a^2$ is provided on the inner side of the longer member of the bow, and the inner lower corner of the yoke plate is correspondingly beveled to ride upon said beveled extension $a^2$ and draw the parts together when tightening the nut C. The depth of the recess or depression $a'$ is immaterial so long as it admits of a longitudinal movement of the yoke plate B after the projection $b'$ has become engaged with said recess or depression $a'$ and the latter may extend entirely through the member of the bow or only a part way, as required. To give greater stability to the fastening it has been found necessary to thicken the free ends of the members of the bow. The opening $a$ is slightly elongated in the direction of the length of the bow in order to permit a limited movement of the yoke plate when tightening the clip on the parts to be secured together.

Figs. 4 and 5 show a specific application of the invention to a thill coupling. The bow is provided on its front side with an extension D which is slotted to form ears between which the thill iron E is inserted. This thill iron is provided with lateral projections $e$ which are adapted to enter recesses $d$ formed in the opposing sides of said ears. These recesses $d$ open downward through the under side of said ears and are closed by the yoke plate B. This yoke plate is similarly constructed to that shown in Figs. 1, 2 and 3 and is extended to close the opening between the ears comprising the said extension D, the projection $b'$ at the outer end of said yoke plate entering a recess or depression formed in the outer end of said extension D. A longitudinal groove $b^4$ is formed in the upper face of the yoke plate to receive the lower end of the thill iron E and serves in a measure to steady said thill iron and prevent lost motion. The rear end of the thill iron is provided with a shoulder $e'$ and a suitable spring or buffer F is located between the bow and the rear end of said thill iron to prevent rattling and take up wear. This spring or buffer is retained in place by the shoulder $e'$.

Having thus described my invention, what I claim, and desire to secure by Letters Patent is:—

1. A clip fastening composed of a bow having its members of unequal length, the longer member having an opening in a plane with the lower end of the shorter member, a yoke plate lying against the lower end of the shorter member and having on one end a projection to extend through the opening in the longer member and receive a fastening, and having at its opposite end an interlocking projection to engage with the shorter member of the bow, substantially as specified.

2. A clip fastening comprising a bow having its members of unequal length, and having a recess in the short member, and having an opening in the long member in a plane with the short member, and a yoke plate lying against the short member and having a vertical projection at one end to enter and interlock with the said recess, and having a projection at its opposite end to pass through the opening in the said long member and receive a fastening, substantially as set forth.

3. A clip fastening composed of a bow having a beveled extension on one of its members, a yoke plate having a projection at one end to interlock with one member of the bow, and having a projection at its opposite end to extend through an opening in the other member of said bow, said plate being constructed to ride upon said beveled extension to draw the parts together, and a fastening applied to the outer end of said projection which extends through a member of the bow to secure and draw the parts together, substantially as set forth.

4. In a clip fastening the combination with a bow having its members of unequal length, and having a dovetail recess in the shorter member, and having an oblong opening $a$ in the other member, and having an incline extension $a^2$ of said member, of a yoke plate having a dovetail projection at one end to enter said dovetail recess, and having its other end beveled to ride upon the beveled extension $a^2$, and having a projection $b$ at said end to extend through the opening $a$ and receive a fastening, substantially as described for the purpose set forth.

5. The combination with a bow having its members of unequal length, and having an extension on the shorter member constructed to form ears, and having recesses $d$ in the opposing sides of said ears, and having a dovetail recess in the forward end of said extension D, and a thill iron having lateral extensions to enter said recesses $d$, of a yoke plate to close the lower open side of said extension D, and having a dove-tail projection at one end to enter said dovetail recess and having a projection at its rear or inner end to extend through an opening in the longer member and receive a fastening, substantially as set forth.

6. The combination with a bow having its rear member made longer than the front member, and provided with a beveled extension $a^2$, and having an oblong opening $a$, and having an extension D on its front member constructed to form ears and provided with recesses $d$ in the opposing sides of said ears, and having dovetail recess $a'$ of a yoke plate having dovetail projection $b'$ at one end to enter said recess $a'$, and having its rear end constructed to ride upon said beveled extension and provided with a projection $b$ to extend through the opening $a$ to receive a suitable fastening, substantially as set forth for the purpose described.

In testimony whereof I affix my signature in presence of two witnesses.

HOWARD H. YOUNG.

Witnesses:
LILLIE M. HILLYARD,
FRANK H. BURNS, Jr.